(No Model.)
E. H. PARKER.
ELECTRIC TEMPERATURE CONTROLLER.
No. 454,985. Patented June 30, 1891.
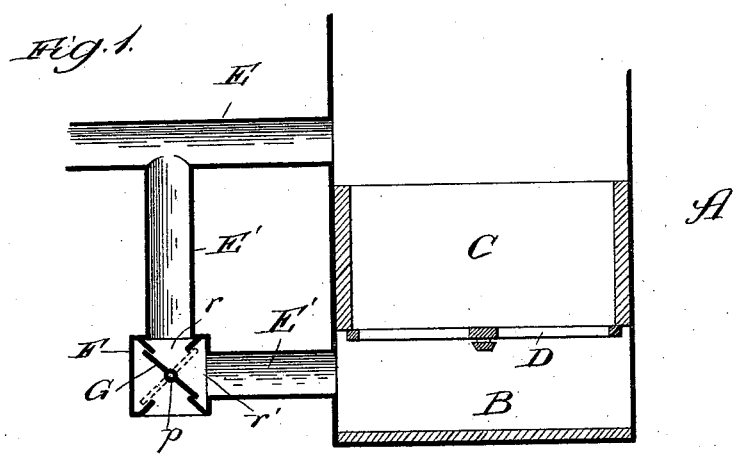
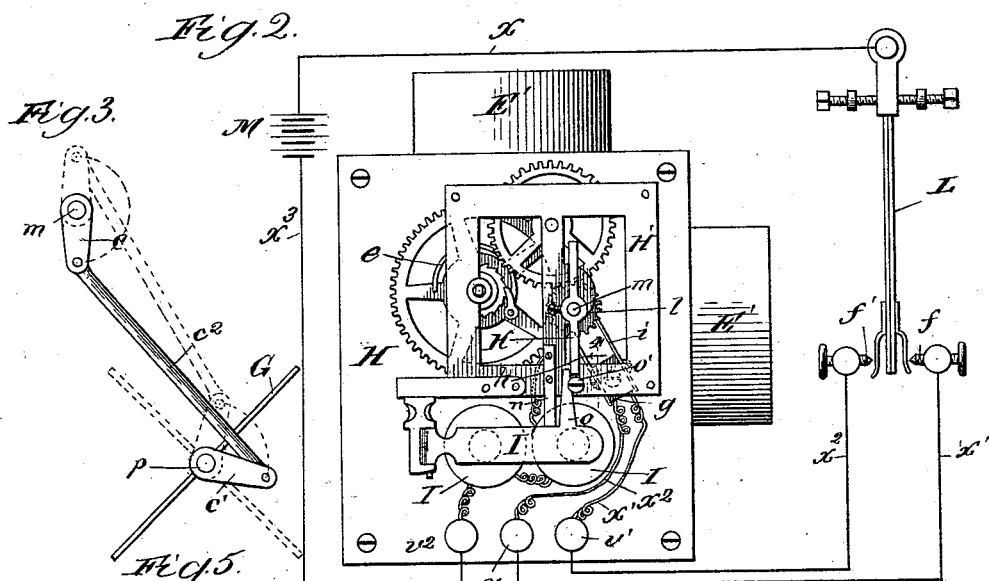
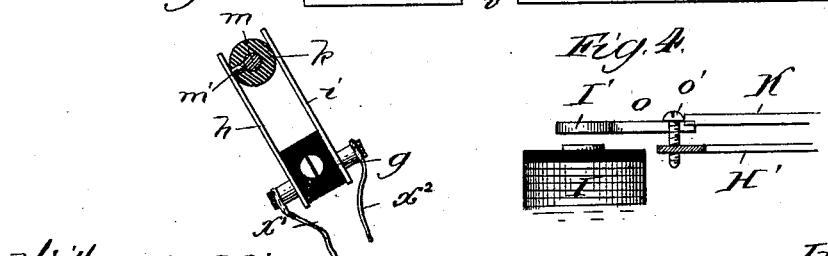
Witnesses:
Chas. E. Gaylord,
Clifford W. White.
Inventor:
Emer H. Parker
By Dyrenforth & Dyrenforth
Att'ys

UNITED STATES PATENT OFFICE.

EMER H. PARKER, OF EVANSTON, ILLINOIS.

ELECTRIC TEMPERATURE-CONTROLLER.

SPECIFICATION forming part of Letters Patent No. 454,985, dated June 30, 1891.

Application filed December 24, 1890. Serial No. 375,664. (No model.)

*To all whom it may concern:*

Be it known that I, EMER H. PARKER, a citizen of the United States, residing at Evanston, in the county of Cook and State of Illinois, have invented a new and useful Improvement in Electric Temperature-Controllers, of which the following is a specification.

My invention relates to an improvement in the class of apparatus for automatically regulating the temperature in the house by the effect of variation thereof upon a thermostat to change its contact and thereby control an electric circuit to actuate a motor to throw a damper (or other valve) of the heater to assume its open or closed position, according to the change desired in the condition of the temperature.

It also relates to an improvement in the apparatus set forth in Letters Patent of the United States No. 425,625, issued to me on the 15th day of April, 1890, wherein the damper for effecting the regulation of the heat-generator occupies the same position and performs its function in the same manner as that shown to be employed with my present improvement, which relates, particularly stated, to the mechanism between the thermostat and the damper.

My objects are to provide for the control of the motor governing the movements of the damper through a single electro-magnet in a single divided circuit and to produce the throwing of the damper back and forth to each of its two positions from a rotary axis of the electrical mechanism adapted to be turned only in one direction.

It is furthermore my object to provide a generally-improved construction of electric temperature-controlling apparatus.

In the accompanying drawings, Figure 1 is a view in broken sectional elevation of a heater with a damper in operative position. Fig. 2 is a view enlarged over the scale observed in Fig. 1 and diagrammatic in its nature, showing my improved electrical mechanism for controlling the damper. Fig. 3 is a diagrammatic view of a crank device forming the connecting medium between the damper and its electrical actuating mechanism. Fig. 4 is a section taken on the line 4 of Fig. 2, viewed in the direction of the arrow and enlarged. Fig. 5 shows a contact detail for the divided portion of the circuit.

My improved electrical mechanism is readily applicable to throwing dampers or other forms of valves in various situations in heaters of different kinds, and I do not, therefore, limit it to the immediate connection nor to the particular movement of the damper illustrated; but, having especially designed it for use with a heater provided with a draft and damper arrangement like that presented in my aforesaid patent, I herein show and describe it in the same connection. However, others skilled in the art to which my improvement relates will from the description be readily able to understand its application in the different situations and connections referred to.

A is a heater, as a stove or furnace, having an ash-pit B in its base and a combustion-chamber C above the ash-pit, the two being separated by a grate D. From the chamber C extends the pipe E, leading to the flue, and the pipe is connected with the ash-pit by a pipe-section E'.

F is a box open at its base and provided with openings $r$ and $r'$, respectively, in its top and in one side and at which it is connected with or coupled into the vertical and horizontal positions of the pipe-section E', thus forming a part of the passage through it.

Inside the box is journaled the damper G, supported on a pivotal axis $p$. In the position of the damper shown by the full lines representing it it shuts off the supply of air from the outside through the box to the ash-pit and is adapted to be moved to and held at that position and its other position (indicated by the dotted lines) by the effect of the current, as hereinafter described. In the dotted position of the damper it admits air through the bottom of the box and opening $r'$ into the ash-pit and permits increase of the upward draft through the fuel in the chamber C, whereas in its other position it obviously shuts off the draft by inducing a tendency to the production of a downdraft of the products of combustion through the fuel by way of the ash-pit and passage E' to the pipe E, whereby and by shutting off the supply of air the intensity of combustion is rapidly reduced.

Following is the description of my improved electrical mechanism adapted to be connected with the axis $p$ of the damper G to throw it alternately to the two positions referred to by the effect upon a thermostat of variation in the temperature in the inclosure to be heated by the furnace A.

H is a base, which may be composed of hard rubber, and to which is fastened an electro-magnet I and clock-work, the latter being supported in a frame H'. The magnet I is shown to be supported at the lower end of the frame from which the armature I' is pivotally supported to extend over the poles of the magnet, and is provided near its free end with a laterally-extending finger $o$, projecting across a stop-pin (screw) $o'$, which may be provided to one side of the finger, and the head of which extends over the upper side thereof, and thus prevents undue outward movement of the armature. A spring $n$ may be provided to extend from the frame H' under the armature to insure its prompt separation from the magnet when demagnetized.

K is a detent, fastened at its center to the outer end of a rotary metal shaft or spindle $m$, journaled in the frame H' and carrying a pinion $l$. Toward its inner end the spindle $m$ is provided with a laterally-projecting contact-stud $m'$, (see Fig. 5,) which passes through and slightly beyond a collar $k$, of insulating material, surrounding the spindle. The collar $k$ is embraced by the free ends of two metal spring-arms $i$ and $h$, secured at their opposite ends to opposite sides of an insulating block $g$, which is fastened to the frame H'.

L is a thermostat, which is supposed to be suspended in the apartment or inclosure the temperature of which is to be regulated, and to which leads the conductor $x$ from one of the poles of an electric generator M. The free end of the thermostat extends between two contacts $f$ and $f'$, whence branches $x'$ and $x^2$ of the line $x$ lead to binding-posts $v$ and $v'$ on the base H and from the posts, through holes in the insulating-block $g$, respectively, into contact with the spring-arms $i$ and $h$. From the opposite pole of the battery M leads the conductor $x^3$ to a binding-post $v^2$ on the base H, and thence into one end of the magnet, the opposite end thereof being included in any suitable manner, as through the frame H' in the battery-circuit.

I inclose the mechanism on the base H in a box-shaped cover (not shown) and fasten the whole to the side of the box F, where connection may readily be made between the damper-axis $p$ and the spindle $m$ of the clock-work, which latter may comprise any suitable gear or arrangement of gears controlled by a spring $e$ to engage with and actuate the pinion $l$ to rotate the spindle $m$ when the latter is free to be revolved. The clock-work illustrated is taken from a clock; but I desire to be understood as using the term broadly to include any suitable motor for actuating a spindle $m$, as suggested.

The connection I provide between the spindle $m$ and axis of a damper having the opposite movements of the damper G to attain its positions comprises a crank $c$, fastened to the end of the spindle $m$, which projects through the base H, a crank $c'$, fastened to the projecting end of the damper-axis $p$, and a link $c^2$, connecting the two cranks from their free ends.

The operation is as follows, the spring $e$ of the clock-work being previously wound up: To have assumed the position in which the damper shown is represented by the full lines in Fig. 1 from that represented by the dotted lines, the thermostat L made contact, say, with the point $f$, whereby the circuit was closed through the wire $x'$, spring $h$, stud $m'$, spindle $m$, frame H', magnet I, and wire $x^3$, and the magnet was thereby energized and attracted its armature. The moment the armature was attracted its finger $o$ was thereby removed from the path of the end of the detent K bearing against it. This permitted the clock-work to act to revolve the spindle $m$, which obviously, through the medium of the linked crank connection with the axis $p$, turned the damper. The turn of the damper is limited in extent to one-half a revolution in either direction, owing to the abutment of an end of the detent in each half-revolution of the spindle $m$ against the finger $o$ of the armature, which springs back from the magnet immediately after the contact produced between the stud $m'$ on the spindle and a spring-arm. Thus it will be seen that the circuit is only closed momentarily by the contact of the thermostat with either of its points $f$ and $f'$. Change in the temperature of the inclosure containing the thermostat which brings it against the contact $f'$ closes the circuit through the wire $x^2$, spring-arm $i$, and other parts described, again momentarily energizing the magnet to attract its armature and free the detent K to permit the spindle $m$ to be turned through a half-revolution and actuate the crank-and-link connection with the axis $p$ to throw the damper back to its position indicated by the dotted lines. Thus each change in the temperature of the inclosure beyond a predetermined degree according to which the thermostat is adjusted induces throwing of the damper in the direction to control the heater to burn with greater or less intensity, as the case may be.

The term "thermostat" herein employed is intended to include any appliance capable of performing the function of the thermostat L.

What I claim as new, and desire to secure by Letters Patent, is—

1. In an electrical apparatus for a temperature-controller, the combination of a thermostat in an electric circuit divided into branches $x'$ and $x^2$ at two contacts between which the thermostat extends, a single electro-magnet in the circuit, a motor having a spindle provided with a stud extending through an insulating-collar on the spindle, a detent on the spindle adapted to engage the armature of the magnet when extending into the path of the detent, and contact-arms to which the said branches lead, insulated from each other and embracing the said collar, substantially as and for the purpose set forth.

2. In an electrical apparatus for a temperature-controller, the combination of a thermostat in an electric circuit divided into branches $x'$ and $x^2$ at two contacts between which the thermostat extends, a single electro-magnet in the circuit having its pivotal armature provided with a finger $o$, a motor having a spindle $m$, provided with a stud $m'$, extending through an insulating-collar on the spindle, a detent K on the spindle normally abutting against the finger and released by the attraction of the armature, and contact-arms $i$ and $h$, to which the said branches lead, insulating from each other and embracing the said collar, substantially as and for the purpose set forth.

3. In combination with a heater having a damper $c$, a thermostat in an electric circuit divided into branches $x'$ and $x^2$ at two contacts between which the thermostat extends, a single electro-magnet in the circuit having a pivotal armature, a motor having a spindle $m$, provided with a stud $m'$, extending through an insulating-collar on the spindle, a detent K on the spindle normally engaging the armature and released by the attraction thereof, contact-arms $i$ and $h$, to which the said branches lead, insulated from each other and embracing the said collar, cranks $c$ and $c'$, respectively, on the spindle and the damper-axis, and a link connecting the cranks at their free ends, the whole being constructed and arranged to operate substantially as described.

EMER H. PARKER.

In presence of—
J. W. DYRENFORTH,
M. J. FROST.